US012343735B2

(12) United States Patent
Rich, Jr.

(10) Patent No.: US 12,343,735 B2
(45) Date of Patent: Jul. 1, 2025

(54) PROCESS AND APPARATUS FOR SEPARATING VARIOUS ELEMENTS SUCH AS CESIUM FROM REFUSE

(71) Applicant: John W. Rich, Jr., Gilberton, PA (US)

(72) Inventor: John W. Rich, Jr., Gilberton, PA (US)

( * ) Notice: Subject to any disclaimer, the term of this patent is extended or adjusted under 35 U.S.C. 154(b) by 0 days.

(21) Appl. No.: 18/645,448

(22) Filed: Apr. 25, 2024

(65) Prior Publication Data

US 2024/0269690 A1 Aug. 15, 2024

Related U.S. Application Data

(63) Continuation-in-part of application No. 18/149,185, filed on Jan. 3, 2023, now Pat. No. 12,011,725.

(51) Int. Cl.

| | |
|---|---|
| ***B03B 9/06*** | (2006.01) |
| ***B03B 5/02*** | (2006.01) |
| ***B03B 5/34*** | (2006.01) |

(52) U.S. Cl.
CPC ................ *B03B 9/061* (2013.01); *B03B 5/02* (2013.01); *B03B 5/34* (2013.01)

(58) Field of Classification Search
CPC B03B 13/005; B03B 5/02; B03B 5/34; B03B 5/447; B03B 9/005; B03B 9/061
See application file for complete search history.

(56) References Cited

U.S. PATENT DOCUMENTS

| | | | |
|---|---|---|---|
| 2,649,963 | A | 8/1953 | Fontein |
| 2,701,641 | A | 2/1955 | Krijgsman |
| 2,724,503 | A | 11/1955 | Fontein |
| 2,726,763 | A | 12/1955 | Rakowsky |
| 2,819,795 | A | 1/1958 | Fontein et al. |
| 2,860,252 | A | 11/1958 | Dijkstra |
| 3,031,074 | A | 4/1962 | Osawa |
| 3,353,673 | A | 11/1967 | Visman |
| 3,379,308 | A | 4/1968 | Horiuchi |
| 3,887,456 | A | 6/1975 | Loughner |
| 3,902,601 | A | 9/1975 | Townley |
| 3,926,787 | A | 12/1975 | Gay |
| 4,164,467 | A | 8/1979 | Liller |
| 4,175,036 | A | 11/1979 | Frykhult |
| 4,203,831 | A | 5/1980 | Parnaby |

(Continued)

FOREIGN PATENT DOCUMENTS

| | | |
|---|---|---|
| GB | 2212077 | 7/1989 |

*Primary Examiner* — Latosha Hines
(74) *Attorney, Agent, or Firm* — McHale & Slavin, P.A.

(57) ABSTRACT

A process for separating Cesium and other elements from refuse. Crushed refuse is admixed with water from a water storage source. The admixture is transferred to a first cyclone separator to divide the admixture into a refuse rich slurry stream and a carbonaceous rich slurry stream. The refuse rich slurry stream is dewatered through a vibrating screen and the water collected sent to the raw feed sump source. The carbonaceous rich slurry is directed to a second cyclone separator to separate low quality carbon from high quality carbon, the high quality carbon is transferred to a third cyclone separator used to separate the element rich media water therefrom. The separated media water is returned via a siphon leg to the raw feed sump, and the dewatered high quality Cesium is available for markets.

12 Claims, 3 Drawing Sheets

(56) References Cited

U.S. PATENT DOCUMENTS

| | | | | |
|---|---|---|---|---|
| 4,217,207 | A * | 8/1980 | Liller | B04C 5/02 209/13 |
| 4,226,708 | A | 10/1980 | McCartney | |
| 4,252,639 | A | 2/1981 | Smith et al. | |
| 4,364,822 | A * | 12/1982 | Rich, Jr. | B04C 5/13 209/729 |
| 4,795,037 | A | 1/1989 | Rich, Jr. | |
| 4,802,976 | A | 2/1989 | Miller | |
| 4,830,741 | A | 5/1989 | Ferencz et al. | |
| 4,865,740 | A * | 9/1989 | Callut | B04C 5/26 209/729 |
| 5,108,608 | A | 4/1992 | Carroll | |
| 5,189,964 | A | 3/1993 | Rich, Jr. | |
| 5,277,368 | A | 1/1994 | Kindig | |
| 6,015,104 | A | 1/2000 | Rich, Jr. | |
| 6,170,770 | B1 | 1/2001 | Rich, Jr. | |
| 6,711,903 | B1 | 3/2004 | Rich, Jr. | |
| 6,869,979 | B1 | 3/2005 | Rich, Jr. | |
| 7,988,754 | B1 | 8/2011 | Rich, Jr. | |
| 10,399,123 | B2 | 9/2019 | Ivanoff | |
| 2009/0165361 | A1 * | 7/2009 | Rappas | C10L 5/00 44/280 |

* cited by examiner

PROCESS AND APPARATUS FOR SEPARATING VARIOUS ELEMENTS SUCH AS CESIUM FROM REFUSE

PRIORITY CLAIM

In accordance with 37 C.F.R. § 1.76, a claim of priority is included in an Application Data Sheet filed concurrently herewith. Accordingly, the present invention claims priority as a continuation-in-part of U.S. patent application Ser. No. 18/149,185, entitled "PROCESS AND APPARATUS FOR SEPARATING ANTHRACITE OR BITUMINOUS FROM REFUSE", filed Jan. 3, 2023, the contents of which the above referenced application is incorporated herein by reference in its entirety.

FIELD OF THE INVENTION

The present invention relates to the energy field and, more specifically, to a process and apparatus for separating various elements particularly Cesium (Cs) from refuse.

BACKGROUND OF THE INVENTION

Since the early 1800's, coal has been valued for its energy content, and substantial quantities of Anthracite was mined and processed to produce coal of various sizes. The coal was separated from mining refuse, and huge mounds of tailings were produced; mine tailings being the material left over after the process of separating the valuable energy rich ore. Tailings processed once or twice by previously known methods are presumed to be uneconomical to further process.

Cesium and caesium, two names for the same chemical element, are represented by the symbol Cs on the periodic table. In American English, the element is typically referred to as "cesium," while in British English, it is more commonly spelled as "caesium." Both spellings are correct and may be used interchangeable in this application. Both spellings denote the same element with the same chemical properties and atomic number (55).

Cesium (Cs) has several important applications due to its unique properties. Some common uses of cesium include:

Medical Imaging: Cesium iodide (CsI) is used as a scintillation material in X-ray and gamma-ray detectors for medical imaging and radiation therapy applications. Cesium iodide scintillators convert incident radiation into visible light, which can be detected by photodetectors to produce high-resolution images.

Research and Development: Cesium is also utilized in various research applications, such as spectroscopy, laser cooling and trapping experiments, and fundamental physics research. Its unique properties make it valuable for studying atomic and molecular behavior under controlled conditions.

Petroleum Exploration: Cesium vapor magnetometers are utilized in geological surveys for petroleum and mineral exploration. These instruments can detect subtle variations in the Earth's magnetic field caused by underground geological structures, aiding in the identification of potential oil and gas reserves.

Ion Thrusters: Cesium is used in ion propulsion systems for spacecraft propulsion. Ion thrusters generate thrust by accelerating ions (typically xenon ions) using electric fields. Cesium is employed as a propellant because it readily ionizes and produces a high specific impulse, allowing spacecraft to achieve efficient and prolonged propulsion in space missions.

Catalysts: Cesium compounds, such as cesium carbonate and cesium fluoride, are employed as catalysts in organic synthesis reactions, including the production of pharmaceuticals, agrochemicals, and specialty chemicals. Cesium catalysts can facilitate certain chemical transformations and improve reaction efficiency.

Photoelectric Cells: Cesium antimonide (Cs3Sb) and other cesium-based compounds are utilized in the construction of photoelectric cells and infrared detectors. These devices are employed in night vision technology, remote sensing, and thermal imaging applications.

Atomic Clocks: Cesium atomic clocks are highly accurate timekeeping devices used in various scientific and technological applications, including GPS systems, telecommunications networks, and research laboratories. Cesium's property of having a well-defined resonance frequency makes it ideal for maintaining precise time standards.

Cesium's distinct characteristics make it indispensable in a wide range of high-tech applications, from precision timekeeping to advanced space propulsion systems. A problem arises in that Cesium is fairly rare and difficult to extract. It has been found that coal mine tailings have an elevated concentration of Cesium. What is needed is an economical process for refining tailings to remove the concentration of Cesium using a method that is environmentally friendly.

SUMMARY OF THE INVENTION

Disclosed is a process and equipment for separating various elements including Cesium from refuse. The process employs several cyclone separators staged to recover low and high quality carbon. The carbon rich overflow from a first cyclone separator reports to a second cyclone separator where the underflow is a low quality carbon and the overflow is high quality carbon. The carbon rich overflow reports to a third cyclone separator which separates the high quality carbon from the element rich slurry. The water from the third cyclone separator is continuously circulated until the density reaches 1.35 or 1.45 (dirty H20) specific gravity, at which point fresh water is added and dirty water removed to a tailings pond, vacuum press, or a centrifuge to be clarified and reused. The process admixes refuse having an approximate size of less than ⅜"×0" with water from a water storage source into a feedstock slurry. The underflow stream is dewatered through a vibrating screen, and the collected water is recirculated to a main feed sump. The slurry is directed to a second cyclone separator to further separate low quality carbon from high quality carbon, the low quality carbon available for a market that uses a lower quality of coal (i.e. Cogen Industry). The high quality element rich slurry is transferred to a third cyclone separator to separate high quality carbon from the element rich slurry, the separated media is returned to the main feed sump.

The element rich slurry is then subjected to chemical processing to extract the cesium. This typically involves leaching the ore with a strong acid, such as hydrochloric acid, to dissolve the cesium-bearing minerals. The resulting solution contains dissolved cesium along with other impurities and elements.

The cesium-containing solution would then undergo purification steps to remove impurities and other elements that may have been dissolved during the leaching process. This could involve techniques such as solvent extraction, ion exchange, or crystallization.

Once purified, the cesium would be recovered from the solution in a concentrated form. This could be achieved through processes such as evaporation, crystallization, or electrolysis, depending on the specific cesium compounds present. The recovered cesium would then be dried and packaged for further use or sale.

An objective of the invention is to recover high quality Cesium and other elements from mine tailings.

Another objective of the invention is to teach a three stage refuse process, summarized as a first cyclone separator for rejecting the bulk of inert fireproof rock, a second cyclone separator for separating high quality carbon from low quality carbon, and a third cyclone separator to separate circulating media water from the high quality carbon.

It is another objective of the instant invention to provide an improved cesium separation process that is environmentally friendly using recycled water.

Yet another object of the instant invention is to reduce the need for ancillary equipment and manpower to separate cesium and other elements from low quality ore.

Yet another objective of the invention is to teach a highly efficient process for the recovery of cesium and other elements from a slurry stream.

Yet still another objective of the invention is to provide an inexpensive method for concentrating rare earth elements including cesium, wherein the method teaches the use of the feed slurry.

An advantage of the process is the minimum amount of energy necessary for operation because the separation is achieved at relatively low specific gravities and relatively low pressures.

Another advantage of the process is that has a low operating cost.

Another advantage of the process is the minimal amount of equipment and make-up water required.

Still another objective is to teach a process which results in an element rich product being produced with zero cost wherein operating costs are covered by the concentration and sale of the separated carbon.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
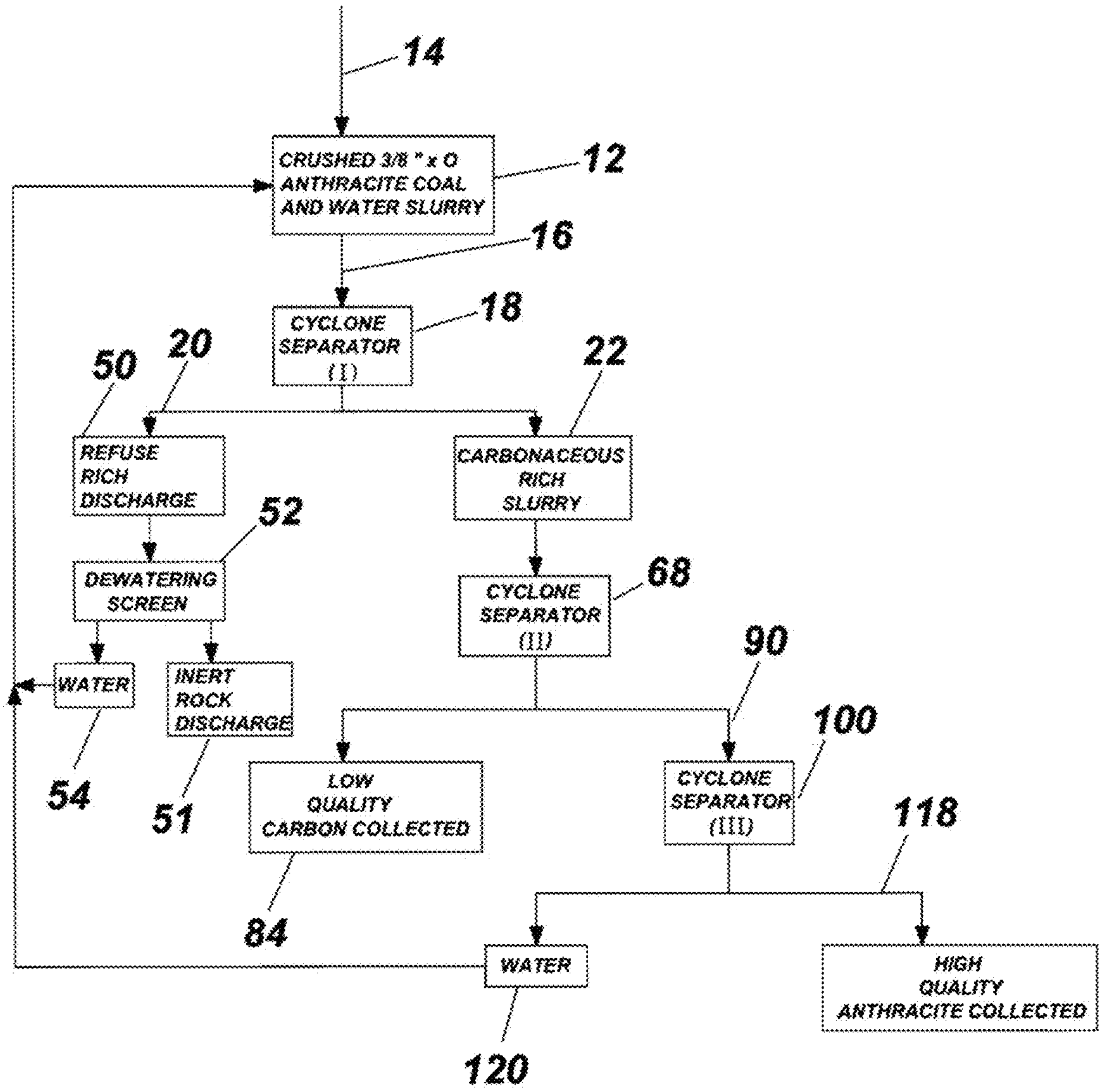
FIG. 1 is a flow chart depicting the staging of the three cyclone separators.
Figure 2:
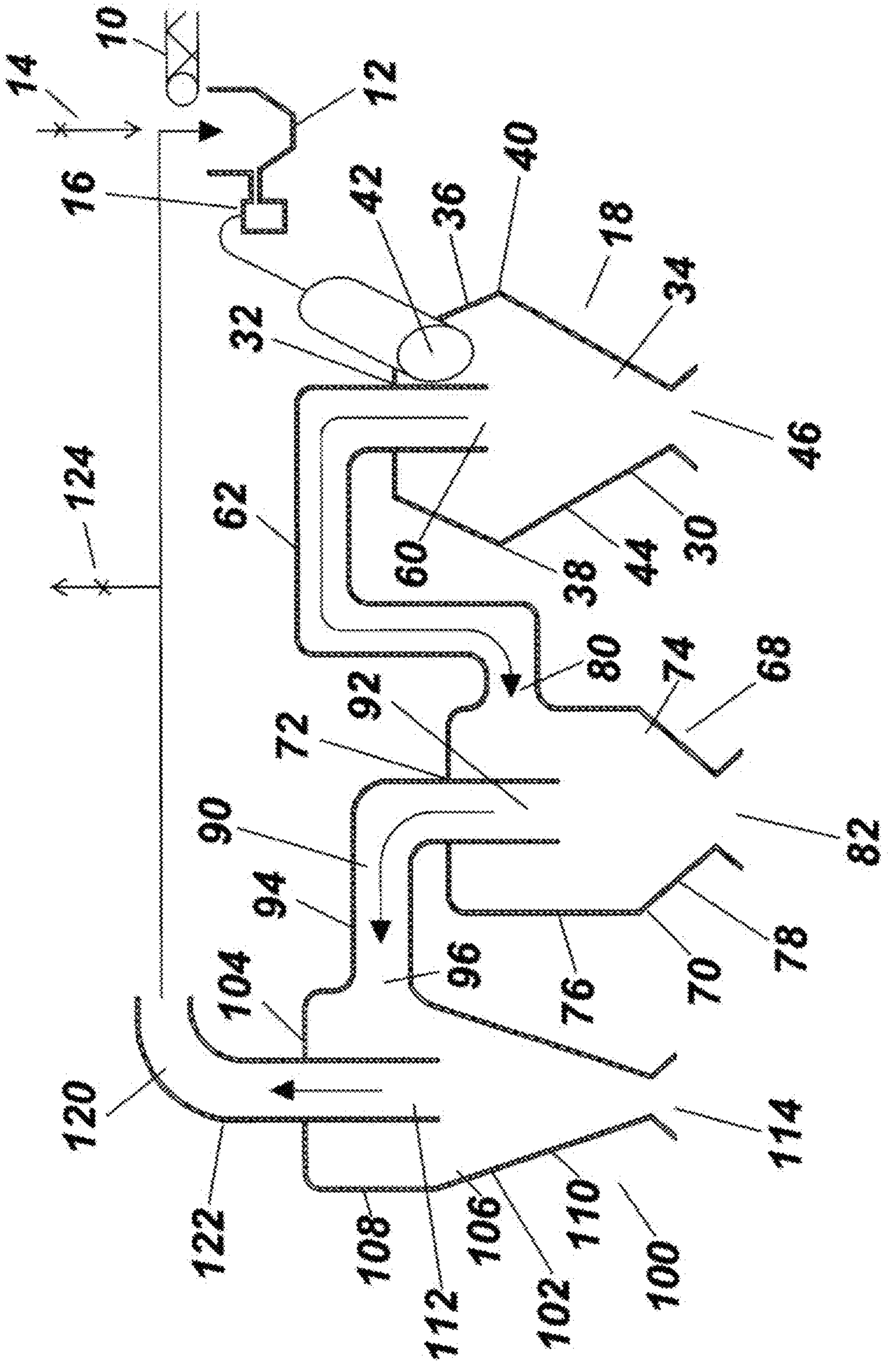
FIG. 2 is a frontal pictorial view of the three cyclone separators per the instant invention.
Figure 3:
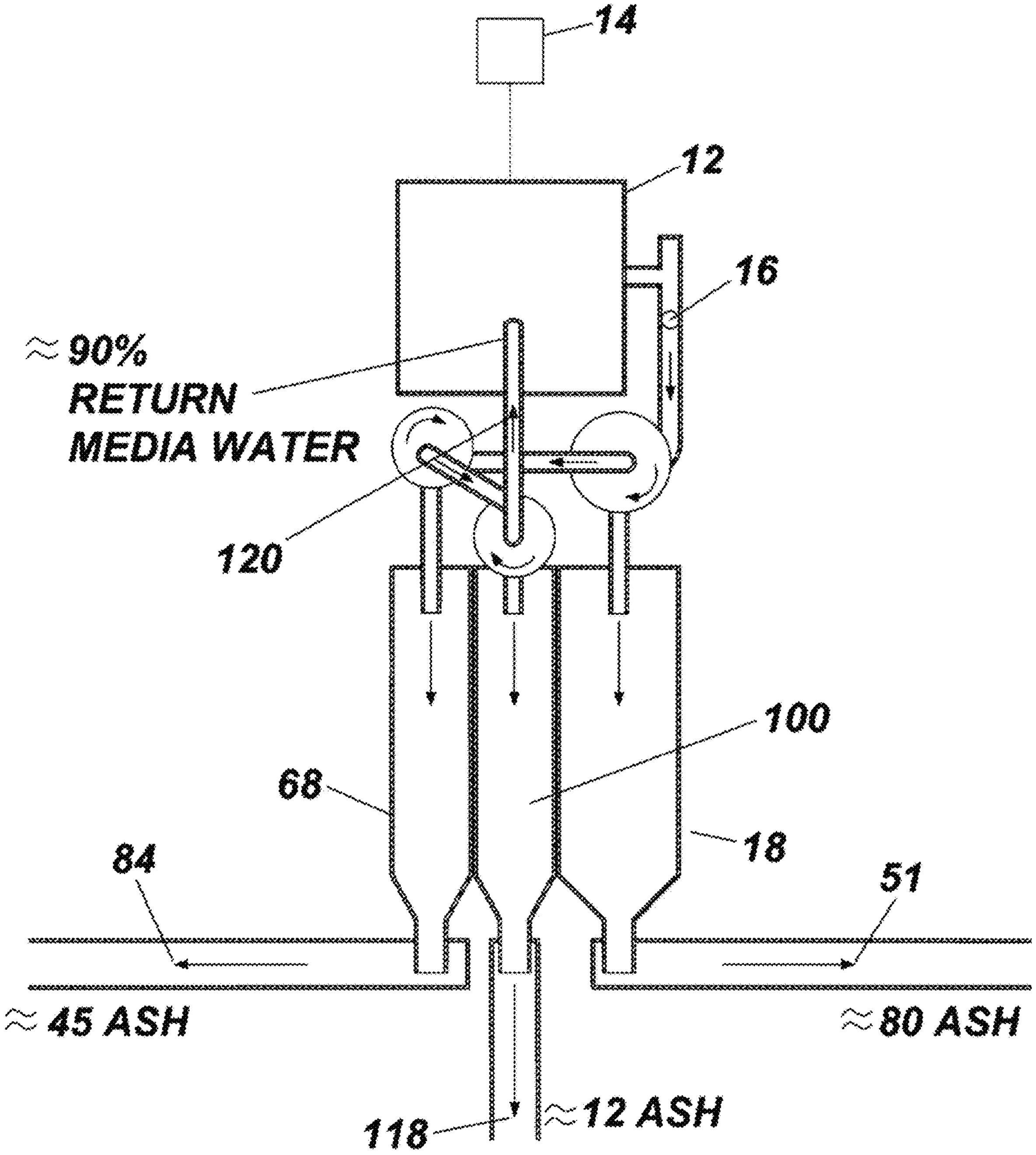
FIG. 3 is a side pictorial view thereof.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

A typical pile of tailings was sampled and comprised the following elements.

| Element | Dry Sample Basis -mg/kg |
|---|---|
| 1. Cerium (Ce) | 82.58 |
| 2. Dysprosium (Dy) | 2.35 |
| 3. Erbium (Er) | 1.43 |
| 4. Europim (Eu) | 1.04 |
| 5. Gadolinium (Gd) | 5.17 |
| 6. Holmium (Ho) | 0.47 |
| 7. Lanthanum (La) | 25.51 |
| 8. Lutetium (Lu) | 0.28 |
| 9. Neodymium (Nd) | 25.09 |
| 10. Praseodymium (Pr) | 7.05 |
| 11. SAMARIUM (Sm) | 5.04 |
| 12. Scandium (Sc) | 33.30 |
| 13. Terbium (Tb) | 0.48 |
| 14. Thulium (Tm) | 0.22 |
| 15. Ytterbium (Yb) | 1.66 |
| 16. Yttrium (Y) | 10.52 |
| 17. Silver (Ag) | 0.27 |
| 18. Gold (Au) | 0.35 |
| 19. Platinum (Pt) | <.010 |
| 20. Palladium (Pd) | .016 |
| 21. Indium (Ir) | <0.10 |
| 22. Indium (In) | 0.11 |
| 23. Lithim (Li) | 74.17 |
| 24. Hafnium (Hf) | 3.02 |
| 25. Rhenium (Re) | <0.10 |
| 26. Thallium (Tl) | 1.40 |
| 27. Boron (B) | 116.65 |
| 28. Colbalt (Co) | 14.82 |
| 29. Gallium (Ga) | 28.02 |
| 30. Germanium (Ge) | 1.87 |
| 31. Rubidium (Rb) | 129.10 |
| 32. Ruthenium (Ru) | <0.10 |
| 33. Rhodium (Rh) | <0.10 |
| 34. Cesium (Cs) | 766.47 |
| 35. Barium (Ba) | 37.34 |

For instance, a typical pile may comprise up to 20% by weight of coal with the balance being refuse. As used herein, the term coal is intended to mean Anthracite or Bituminous coal, and the term refuse is intended to mean a variety of inorganic matter such as rocks, shale, slate, clay, and the like, which is mined along with the coal. Referring to the figures in general, in the processes, refuse 10 which may comprise less than 20% coal by weight, is crushed and screened to an approximate size range of less than 3/8"×0". The crushed refuse is admixed with water 14 drawn from a water source forming an admixture 16. The admixture 16 is transferred into a first cyclone separator 18 constructed and arranged to divide the admixture 16 into a refuse rich slurry stream 20 and a rich slurry stream 22. Preferably, as further described herein, the cylindrical shaped cyclone separators have a continuous sidewall shaped to adjust acceleration/centrifugal force of the slurry stream. A first cyclone separator 18 has a continuous sidewall 30 depending from a top wall 32 forming a chamber 34 therein. An upper section 36 is formed by the sidewall 30 expanding from a first diameter, as measured by the size of the top wall 32 expanding outwardly to a middle section 38 forming a second diameter 40, as measured along the widest portion of the sidewall 30. The admixture 16 is admitted through an inlet 42 formed tangentially in the sidewall 30, wherein acceleration is slowed and then rapidly increased upon entering a third section 44, wherein the sidewall 30 is formed into a conical shape diminishing in diameter from the middle section 38 to a first apex 46 to expel a refuse rich slurry 50 containing inert rock. The refuse rich slurry 50 is passed over a vibrating screen 52 for dewatering. Water 54 collected from the dewatering step is directed to the raw feed sump 12 for reuse, and the inert rock 51 with about 80% ash content is discharged. Because of the cylindrical shape, a substantial deceleration and acceleration is imparted to the solids as they circulate in the chamber at any given radius.

The carbon rich slurry stream 22 is drawn from an outlet 60 through a transfer line 62 to a second cyclone separator 68. The second cyclone separator 68 has a continuous sidewall 70 depending from a top wall 72 forming a chamber 74 therein. An upper section 76 is formed by the sidewall 70 depending from a first diameter, as measured by the size of the top wall 72, with a uniform diameter to a lower section 78. The admixture, being a carbon and cesium rich slurry stream 22, is admitted through an inlet 80 formed tangentially in the sidewall 70, wherein acceleration is maintained and then rapidly increased upon entering the lower section 78, wherein the sidewall 70 is formed into a conical shape, diminishing in diameter along the length of the lower section 78 to a second apex 82 for expelling a low quality carbon 84 with about 45% ash content. The high quality slurry 90 is drawn from the vortex 92. The high quality carbon exits the second cyclone separator 68 through an intake 92 and transfer line 94. A cylindrical type of cyclone is to be contrasted with a tapered or variable acceleration type, wherein the shell has a depending frusto-conical or tapered portion of substantial length and a relatively small included cone angle. Because of the conical shape, the acceleration forces increase on the particles as they circulate and advance.

The specific gravity of the medium tends to increase after the process has been operating in the steady state for a period of time. In order to control the specific gravity of the element rich medium within the desired range upstream of the first cyclone separator, the recirculating media is constantly monitored with a density gauge so that appropriate action can be taken to maintain the specific gravity within the desired range. For instance, if the specific gravity should increase beyond the desired limit, it can be reduced by bleeding media water out of the system and adding fresh water. If the specific gravity should drop below the desired lower level, it can be increased by increasing the particulate matter in the crushed material make up.

The high quality carbon slurry stream 90 is drawn through the transfer line 94 to a third cyclone separator 100. The third cyclone separator 100 has a continuous sidewall 102 depending from a top wall 104 forming a chamber 106 therein. An upper section 108 is formed by the sidewall 102 depending along a first diameter, as measured by the size of the top wall 104 maintaining a uniform diameter to a lower section 110. The high quality slurry 90 is admitted through an inlet 96 formed tangentially in the sidewall 102, wherein acceleration is maintained and then rapidly increased upon entering the lower section 110. The sidewall 102 is formed into a conical shape, diminishing in diameter along the length of the lower section 110 to a third apex 114 used for expelling dewatered high quality 112 carbon with about 12% ash content. In one embodiment, the third cyclone 100 operates to separate the high quality carbon slurry 90 from the media fluid 120 drawn from an intake 112 of the cyclone separator 100 through a transfer line 122 with a bleed line 124 for drawing cesium and other valuable elements with about 80% return of the media fluid 120 to the raw feed sump 12. To maintain a specific gravity of the admixture 16, the fresh water 14 is mixed with the refuse 10 to continue with the recycling and removal of high quality elements, namely Cesium from the system.

According to this preferred embodiment of the present invention, the above-described process will operate efficiently in a continuous manner to separate carbon of different qualities from refuse, and draw high quality elements such as Cesium from the process, provided certain process conditions are observed. For instance, for Anthracite coal it is important that the specific gravity of the water is measured through the water storage source. For Anthracite coal having a specific gravity of about 1.75, the density of the water should be maintained in a range of about 1.35 and 1.45 specific gravity.

In a preferred embodiment, the feedstock slurry is supplied at a static pressure in a range of about 10 psi to about 20 psi at a volumetric flow rate in a range of about 2,000 gpm.

The process disclosed herein is directed to separating cesium and other elements and a high and low quality carbon from refuse. While some adjustments in operating conditions will have to be made to compensate for the different specific gravity of the element rich slurry, such adjustments should be apparent to those skilled in the art in light of the present disclosure.

The concentrated ore is then subjected to chemical processing to extract the carbon. This typically involves leaching the ore with a strong acid, such as hydrochloric acid, to dissolve the minerals. The resulting solution contains dissolved carbon along with other impurities. The cesium-containing solution would undergo purification steps to remove impurities and other elements that may have been dissolved during the leaching process. This could involve techniques such as solvent extraction, ion exchange, or crystallization. Once purified, the cesium would need to be recovered from the solution in a concentrated form. This could be achieved through processes such as evaporation, crystallization, or electrolysis, depending on the specific cesium compounds present. The recovered cesium would then be dried and packaged for further use or sale.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for separating Cesium from refuse comprising the steps of:

crushing coal refuse into an approximate size less than ⅜"×0;

admixing the crushed refuse with water in a raw feed sump into an admixture;

transferring the admixture to a first cyclone separator having a substantially cylindrical chamber further defined by an upper section of a first diameter, a middle section having a second diameter greater than said first diameter reducing the speed of the admixture rotation, and a conical shaped lower section diminishing in diameter from said middle section, said first cyclone separator constructed and arranged to divide said admixture into a refuse ich slurry stream of about 80 Ash content to be discharged from a first apex positioned at the bottom of said lower section and a carbonaceous rich slurry stream drawn from an outlet positioned at said second diameter;

directing said refuse rich slurry stream through a vibrating Screen, said vibrating screen dewatering said refuse rich slurry stream and directing water collected from said dewatering step to said raw feed sump;

transferring said carbonaceous rich slurry drawn from said outlet positioned at said second diameter of said middle section of said first cyclone separator to a second cyclone separator having a substantially cylindrical chamber defined by an upper section of a first diameter, a middle section having a second diameter equal to said first diameter, and a conical shaped lower section diminishing in diameter from said second section constructed and arranged to separate low quality carbon of about 45 Ash content from a high quality carbon slurry;

collecting the low quality carbon from a lower section of said second cyclone separator;

transferring the high carbon slurry drawn from an intake positioned at an upper section of said second cyclone separator to a third cyclone separator constructed and arranged separate media from high quality carbon slurry, said third cyclone separator having a substantially cylindrical chamber defined by an upper section of a first diameter and a conical shaped lower section diminishing in diameter to an outlet;

returning fluid separated from the high quality carbon slurry drawn from an intake positioned where an upper section defined by a uniform diameter meets a lower section defined by a diminishing diameter of said third cyclone separator to said raw feed sump;

bleeding a portion of said returning fluid for recovery of elements.

2. The process according to claim 1 including the step of monitoring said fluid to maintain a density between a range of 1.35 and 1.45 specific gravity.

3. The process according to claim 2 wherein fresh water is added to said raw water feed sump to maintain said specific gravity range.

4. The process according to claim 1 wherein the element rich water exceeding said specific gravity range is directed to a vacuum press for clarification and the clarified water directed to said raw feed sump.

5. The process according to claim 1 wherein the element rich water exceeding said specific gravity is directed to a centrifuge to be clarified and the clarified water returned to said raw feed sump.

6. The process according to claim 1 wherein water exceeding said specific gravity range is directed to a tailing pond.

7. The process according to claim 1 wherein feedstock slurry is introduced into said upper section of said first cyclone separator.

8. The process according to claim 1 wherein said second cyclone conical shaped lower section diminishing in diameter from said second section to expel low quality ore.

9. The process according to claim 1 wherein said third cyclone is constructed and arranged for discharge of high quality cesium.

10. The process according to claim 1 wherein said first cyclone separator middle section includes an axial extent greater than said first section for imparting tangentially-admitted feedstock slurry, a reduction in acceleration followed immediately by increasing acceleration in a depending lower section conical portion.

11. The process according to claim 10 wherein said feedstock slurry is supplied at a static pressure in a range of about 10 psi to about 20 psi at a volumetric flow rate in a range of about 2,000 gpm.

12. The process according to claim 1 wherein said element is Cesium.

* * * * *